United States Patent [19]

Jarman et al.

[11] 4,322,890

[45] Apr. 6, 1982

[54] DATUM LINE GAUGE SYSTEM

[76] Inventors: Davis R. Jarman, 612 Ward Dr.; Virgil H. Hinson, 206 Fairway Oaks Dr., both of Brunswick, Ga. 31520

[21] Appl. No.: 131,090

[22] Filed: Mar. 17, 1980

[51] Int. Cl.³ .................... G01C 15/12; G01B 11/26
[52] U.S. Cl. ................................ 33/288; 33/203.15; 33/180 AT; 33/384
[58] Field of Search ............ 33/384, 370, 373, 174 L, 33/174 R, 203, 203.15, 181 AT, 180 AT, 288, 335, 342, 375

[56] References Cited

U.S. PATENT DOCUMENTS

| | | | |
|---|---|---|---|
| 1,601,261 | 9/1926 | Prather | 33/203.15 |
| 2,798,296 | 7/1957 | Liskey | 33/288 |
| 4,098,003 | 7/1978 | Négrin | 33/180 AT |
| 4,193,203 | 3/1980 | LeGrand et al. | 33/180 AT |
| 4,207,681 | 6/1980 | Bayorgeon et al. | 33/180 AT |

FOREIGN PATENT DOCUMENTS 998680  9/1951  France .............. 33/203.15

Primary Examiner—William D. Martin, Jr.
Attorney, Agent, or Firm—Harvey B. Jacobson

[57] ABSTRACT

A plurality of gauges are provided with each gauge including a horizontal arm, a vertical elongated measuring member guidingly supported from one end of the arm for adjusted vertical shifting relative thereto and first lock structure operatively associated with the arm and the measuring member for releasably locking the measuring member in adjusted shifted position relative to the arm. A vertical standard is provided including mounting structure supporting the arm from the standard for vertical shifting therealong with the arm disposed at right angles relative to the standard. Second locking structure is operatively associated with the arm and the standard for releasably locking the arm in adjusted shifted position relative to the standard and levelling structure is carried by the arm for indicating when the arm is precisely horizontally disposed. A base is carried by the lower end of the standard for support of the standard from a floor surface and the base defines a pair of downwardly facing support surfaces spaced along a horizontal path normal to a radius of the center axis of the standard and spaced outwardly from the axis. A third downwardly facing and vertically adjustable support surface is defined by the base and disposed on the side of the center axis remote from the aforementioned path and the mounting structure supporting the arm from the standard includes structure operative to allow at least 180° angular displacement of the standard about its center axis relative to the arm.

6 Claims, 6 Drawing Figures

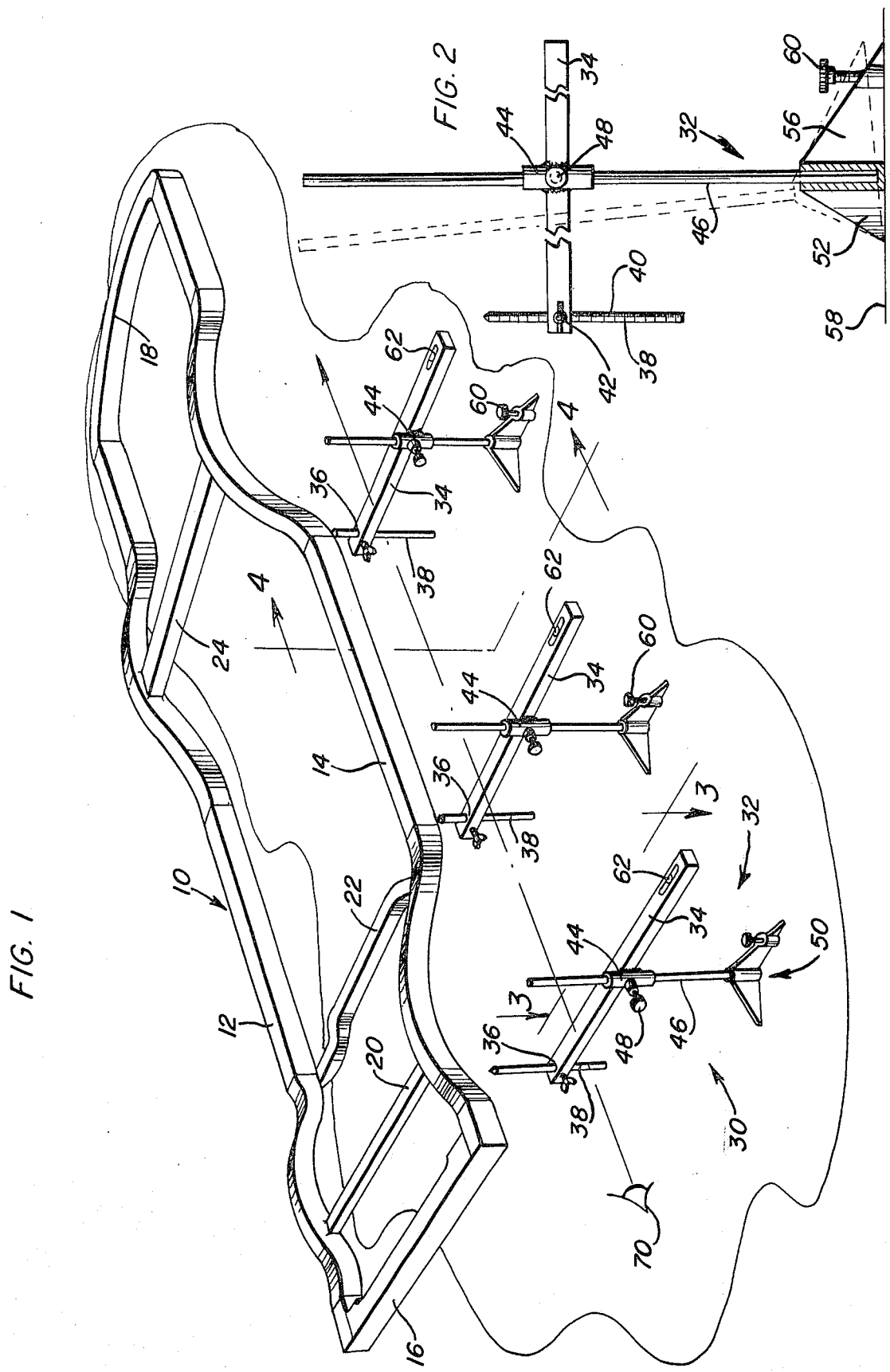

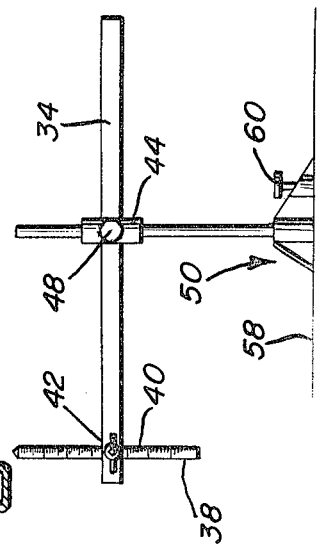
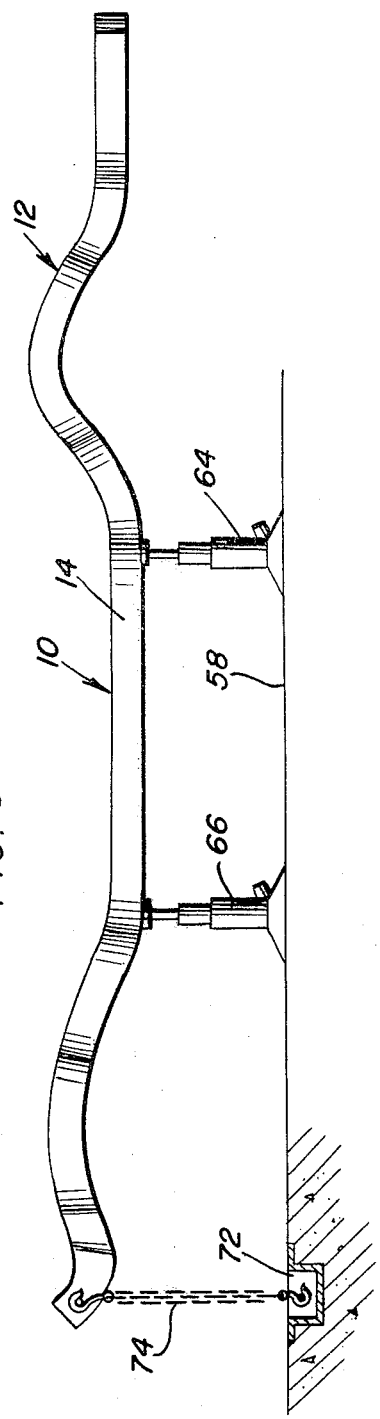
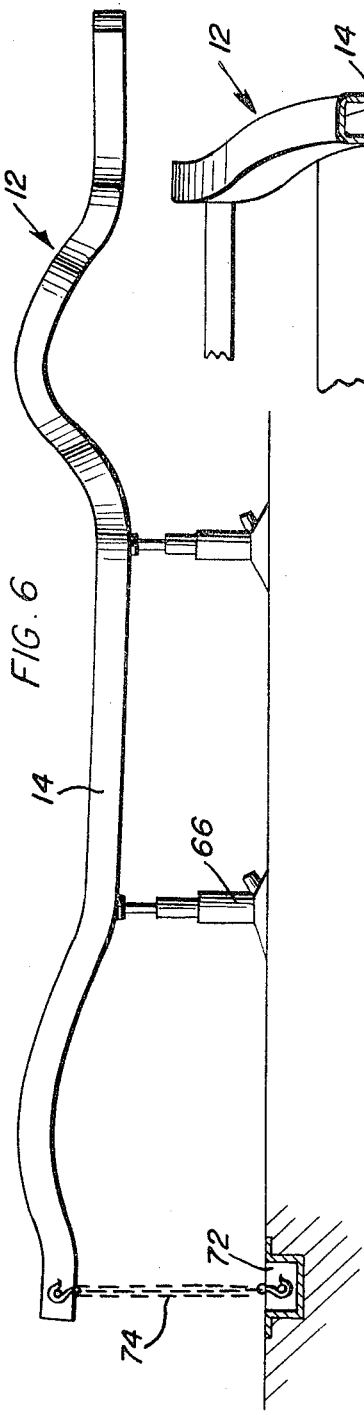
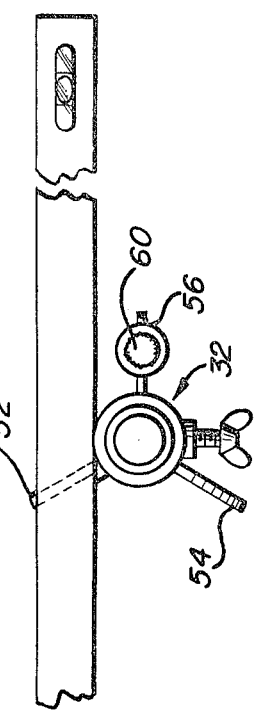

DATUM LINE GAUGE SYSTEM

BACKGROUND OF THE INVENTION

Vehicle frames often have their opposite end portions bent upwardly or downwardly as a result of accident involving front or rear end damage. In order to straighten such a distorted vehicle frame, it is advantageous to establish a datum line adjacent the frame in order that the distance of certain frame portions from the datum line may be checked and corrected (by frame bending) when necessary.

If a bent vehicle frame is not restored to its proper dimensions and spacial relationships relative to a datum line, interference between adjacent body components may result and the various running gear components of the vehicle may not be properly positioned relative to the frame in order to assure proper riding and handling characteristics.

Although datum line charts for various motor vehicle frames are provided by the corresponding motor vehicle manufacturers and similar charts may be reasonably accurately produced for other models of motor vehicles whose manufacturers do not provide datum line charts, present methods of establishing datum lines relative to a vehicle frame are cumbersome and time consuming. Accordingly, a need exists for quickly and accurately establishing a vehicle frame datum line.

Various frame gauge structures and assemblies, including some of the general structural and operational features of the instant invention, are disclosed in U.S. Pat. Nos. 2,798,296, 3,057,074, 3,151,396 and 3,661,575. However, these previously known structures involve the expenditure of considerable time to achieve proper positioning thereof relative to an associated vehicle frame and are not readily usable in conjunction with all types of frames and unitized vehicle body structures, including sub-frames.

BRIEF DESCRIPTION OF THE INVENTION

The vehicle frame datum line establishing system of the instant invention utilizes a plurality of gauges (preferably at least three gauges) which may be readily erected relative to a stationarily supported vehicle frame and quickly utilized to establish a frame datum line. Each of the gauges includes an upright standard including a lower end levelling base and a horizontal arm supported from the standard for vertical adjustment therealong and angular displacement of the arm at least 180° relative to the standard about its center axis. One free end of the arm includes a vertical elongated measuring member guidingly supported from the arm for adjusted vertical shifting relative thereto and the arm is additionally provided with a spirit level for indicating when the arm is horizontal.

The main object of this invention is to provide a vehicle frame datum line establishing system of gauges which may be readily erected adjacent a vehicle frame and utilized to establish a datum line from which the spacing of various frame portions away from the line may be quickly determined.

Yet another object of this invention is to provide a system of gauges which may be utilized in conjunction with vehicles equipped with full frames as well as unitized body vehicles equipped with sub-frame portions.

Still another important object of this invention is to provide a datum line establishing gauge system which may be utilized quickly and accurately to determine datum line charts for vehicles whose manufacturers do not provide such charts.

A final object of this invention to be specifically enumerated herein is to provide a plurality of gauges for establishing a vehicle frame datum line in accordance with the preceding objects and which will conform to conventional forms of manufacture, be of simple construction and easy to use so as to provide a system of gauges which will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the typical vehicle frame with the gauge system of the instant invention operatively associated therewith to define a datum line;

FIG. 2 is an enlarged side elevational view of one of the gauges;

FIG. 3 is an enlarged fragmentary horizontal sectional view taken substantially upon the plane indicated by the section line 3—3 of FIG. 1;

FIG. 4 is an enlarged fragmentary transverse vertical section view taken substantially upon the plane indicated by the section line 4—4 of FIG. 1;

FIG. 5 is a schematic side elevational view of a vehicle frame whose forward end portion has been upwardly bent as the result of an accident and with the frame supported from a pair of jacks and having its forward end anchored relative to a floor anchor preparatory to straightening the frame; and FIG. 6 is a schematic view similar to FIG. 5, but illustrating the left hand frame supporting jack slightly elevated to effect a downward bending movement of the floor anchored forward end frame portion.

DETAILED DESCRIPTION OF THE INVENTION

Referring now more specifically to the drawings, the numeral 10 generally designates a typical vehicle frame including opposite side longitudinal members 12 and 14 and front and rear transverse members 16 and 18 interconnecting the front and rear ends of the longitudinal members 12 and 14. In addition to the transverse members 16 and 18, the frame 10 includes additional transverse members 20, 22 and 24 extending between the longitudinal members 12 and 14 intermediate the transverse members 16 and 18.

The datum line establishing gauge system of the instant invention is referred to in general by the reference numeral 30 and includes a plurality of gauges (preferably at least three) referred to in general by the reference numeral 32. Each gauge 32 includes a horizontal arm 34 having a vertical passage 36 formed through one end thereof and a vertical elongated measuring member 38 is guidingly received through the corresponding passage 36. The measuring member 38 has longitudinally spaced measuring indicia 40 thereon and the arm 34 is provided with a set screw 42 by which vertical adjusted positioning of the measuring member 38 may be releasably retained.

The approximate longitudinal midportion of the arm 34 includes a cylindrical vertically disposed mounting sleeve 44 rigidly mounted thereon and the sleeve 44 is guidingly and slidingly as well as rotatably disposed on a cylindrical standard 46 and may be rotated at least 180° relative to the standard 46. The sleeve 44 includes a set screw 48 by which the sleeve 44 may be releasably locked in vertically shifted position along the standard 46 and the lower end of the standard 46 includes a support base referred to in general by the reference numeral 50. The support base 50 includes three radially outwardly and equally circumferentially spaced feet 52, 54 and 56. The outer ends of the feet 52 and 54 define downwardly facing support surfaces for engagement with the floor 58 and which are spaced along a horizontal path normal to a radius of the center axis of the standard 46. This path is spaced outwardly from the standard center axis on one side thereof. The third foot 56 includes a threadedly adjustable mounted member 60 whose lower end defines a third downwardly facing support surface and this third downwardly facing support surface is vertically adjustable relative to the support base 50 and is spaced on the side of the center axis of the standard 46 remote from the aforementioned path in which the first two downwardly facing support surfaces are disposed. Accordingly, the member 60 may be threadedly adjusted relative to the foot 56 in order to establish vertical positioning of the standard 46 and thus horizontal positioning of the arm 34. The end of the arm 34 remote from the measuring member 38 includes a spirit level 62 for indicating when the arm 34 is level.

In operation, the frame 10 may initially be stationarily supported relative to the floor 58 through the utilization of a pair of hydraulic jacks 64 and 66. Once the jacks 64 and 66 have been utilized to support the frame 10 in generally horizontal position relative to the floor 58, two gauges 32 corresponding to the right side and center gauges of FIG. 1 may be positioned as indicated in FIG. 1 and have the measuring members 38 thereof vertically adjusted according to a frame datum line chart. The measuring members 38 of these two gauges are adjusted to the vertical distances of the adjacent frame portions relative to the datum line and the sleeves 44 of these gauges are then raised until the upper ends of the measuring members 38 are aligned with either the under or upper surfaces of the adjacent frame portions, as required by the datum line chart. Of course, the members 60 of these gauges are adjusted to insure that the standard 46 thereof are vertically disposed and the spirit levels are viewed to determine when the arms 34 are level.

When this has been accomplished, the upper surfaces (planar and horizontal) of the support arms 34 of these two gauges establish a horizontal plane containing the datum line. Thereafter, the third gauge 32 may have its measuring member 38 adjusted according to the datum line chart relative to the frame 10 and positioned adjacent the upwardly bent front end of the frame 10 at the left side of FIG. 5. With the arm 34 of the third gauge 32 vertically adjusted to position the upper end of the preset measuring member 38 at the proper elevation (the upper or lower surface of the front end of the frame 10), the user of the gauges may then position himself forward of the frames and may sight as at 70 (see FIG. 1) across the upper surfaces of the support arms 34. If the support arm 34 adjacent the front end of the frame 10 is at a higher elevation than the plane established by the upper surfaces of the support arms 34 spaced rearward of the front gauge 32, as the viewer sights across the upper surfaces of the front and rear arms 34, the center arm 34 will be noted as depressed. At this point, the upwardly bent front end of the frame is anchored to a floor anchor 72, see FIGS. 5 and 6, by a chain 74 and the jack 66 may be actuated to upwardly displace the corresponding frame portion until the upper surface of the front gauge arm 34 is aligned with a plane containing the upper surfaces of the support arms 34 of the gauges disposed rearward of the front gauge 32. Inasmuch as the frame 10 is somewhat flexible, a second bending operation may need to be performed in order to finally position the upper surfaces of all of the arms 34 in the same plane.

Of course, after the jack 66 has been elevated an amount determined to effect the approximate bending operation needed, the support arm 34 of the adjacent gauge 32 is raised to the proper position relative to the upwardly jacked adjacent frame portion and a sighting is again made across the upper surfaces of all of the support arms 34.

During the frame straightening operation, the opposite side portions of the frame 10 each may be supported from a pair of jacks 66 and 64. Also, a second set of gauges 32 may be erected relative to the opposite side of the frame, inasmuch as the frame 10 may be twisted as well as upwardly or downwardly deflected at either end.

However, with a minimum amount of effort, the frame 10 may have various longitudinally spaced portions thereof properly positioned relative to the datum line established by the gauges 32.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A system of gauges for checking and correcting vehicle frame location datum line distances, said system including at least three gauges, each of said gauges including a horizontal arm, a vertical elongated measuring member guidingly supported from one end of said arm for adjusted vertical shifting relative thereto, first lock means operatively associated with said arm and measuring member for rleasably locking said measuring member in adjusted shifted position relative to said arm, a vertical standard, mounting means mounting said arm from said standard for adjusted shifting therealong and with said arm at right angles relative to said standard, second lock means operatively associated with said arm and standard for releasably locking said arm in adjusted shifted position relative to said standard, level means carried by said arm for indicating when said arm is horizontal, base means carried by the lower end of said standard for support of said standard from a generally horizontal support surface, said base means including means defining a pair of downwardly facing support surfaces spaced along a horizontal path normal to a radius of the center axis of said standard and spaced radially outwardly of said standard and a third downwardly facing and vertically adjustable support surface spaced on the other side of said center axis from said path, said mounting means including means operative to allow at least 180° angular displacement of said standard about its center axis relative to said arm:

2. The combination of claim 1 wherein said standard comprises a cylindrical member and said mounting means includes a vertical sleeve carried by said arm freely slidable and rotatable on said standard, said second lock means comprising a set screw carried by said sleeve.

3. The combination of claim 1 wherein said base includes three generally equally circumferentially spaced and radially outwardly projecting foot portions, the outer ends of two of said foot portions defining said pair of downwardly facing support surfaces, said third downwardly facing and vertically adjustable support surface comprising the lower end of a vertical adjustment screw threadedly supported from the outer end of the third foot portion.

4. The combination of claim 3 wherein said standard comprises a cylindrical member and said mounting means includes a vertical sleeve carried by said arm freely slidable and rotatable on said standard, said second lock means comprising a set screw carried by said sleeve.

5. The combination of claim 4 wherein said arms include corresponding planar and horizontal upper surface portions.

6. In combination with a vehicle frame supported in elevated position relative to a generally horizontal support surface and including an elongated marginal portion generally paralleling a predetermined datum line, a system of gauges for checking and correcting the distances of various portions of said frame marginal portions spaced therealong from said datum line, said system including at least three gauges, each of said gauges including a horizontal arm, a vertical standard, mounting means mounting said arm from said standard for adjusted shifting therealong with said arm at generally right angles relative to said standard, lock means operatively associated with said arm and standard for releasably locking said arm in adjusted shifted position relative to said standard, level means carried by said arm for indicating when said arm is horizontal, base means carried by the lower end of said standard for support of said standard from a generally horizontal support surface, said base means including means defining a pair of downwardly facing support surfaces spaced along a horizontal path normal to a radius of the center axis of said standard and spaced radially outwardly of said standard and a third downwardly facing and vertically adjustable support surface spaced on the other side of said center axis from said path, said mounting means including means operative to allow at least 180° angular displacement of said standard about its center axis relative to said arm, said lock means also being operatively associated with said arm and standard for releasably locking said arm in adjusted angular position relative to said standard.

* * * * *